United States Patent [19]
Baxter, Sr.

[11] Patent Number: 5,688,400
[45] Date of Patent: Nov. 18, 1997

[54] WASTE WATER TREATMENT PLANT

[75] Inventor: Thomas D. Baxter, Sr., Greenville, Miss.

[73] Assignee: Environmental Treatment Facilities, Inc., Greenville, Miss.

[21] Appl. No.: 612,332

[22] Filed: Mar. 7, 1996

[51] Int. Cl.$^6$ .................................................. C02F 3/20
[52] U.S. Cl. ............................ 210/195.3; 210/195.4; 210/220; 210/256; 210/525
[58] Field of Search ..................... 210/194, 195.1, 210/195.3, 195.4, 220, 256, 525, 629, 540

[56] References Cited

U.S. PATENT DOCUMENTS

| | | | |
|---|---|---|---|
| 2,264,912 | 12/1941 | Kipper | 210/525 |
| 2,824,645 | 2/1958 | Griffith | 210/525 |
| 3,043,433 | 7/1962 | Singer | 210/629 |
| 3,186,939 | 6/1965 | Murray | 210/195.3 |
| 3,339,741 | 9/1967 | Bernard et al. | 210/195.4 |
| 4,192,740 | 3/1980 | Savard et al. | 210/629 |
| 4,781,356 | 11/1988 | Payne | 251/8 |
| 4,954,257 | 9/1990 | Vogelpohl et al. | 210/195.3 |
| 5,088,522 | 2/1992 | Rath et al. | 251/7 |
| 5,207,409 | 5/1993 | Riikonen | 251/7 |
| 5,395,527 | 3/1995 | Desjardins | 210/629 |
| 5,441,634 | 8/1995 | Edwards | 210/195.3 |

*Primary Examiner*—Christopher Upton
*Attorney, Agent, or Firm*—Donald C. Casey

[57] ABSTRACT

A modular sewage treatment plant is disclosed using a vessel adapted to contain the standard three phases of a sewage treatment, aeration, settling and clarification. The vessel of this invention uses an inverted, centrally located funnel section to received raw sewage to be treated at the upper opening, and to inject air, counter-currently, at a 180 degree angle to the descending sewage. The aerated sewage leaves the bottom of the aeration section and solids enter a settling section therebelow whereas water to be clarified rises around the outer surface of the funnel shaped aeration section. A hopper shaped bottom in the settling section is provided to facilitated solids removal and a weir system is provided on the upper surface of the clarification section to serve as a scum remover for the clarified water. The invention also includes a flow control valve for admitting raw sewage to the vessel which is a pinch valve utilizing a flexible casing having internally located tear drops inserts on opposed side and external pinch bars having rounded ends so that when the pinch bars pinch the casing closed the edges thereof will abut the tear drops eliminating stress from the edges.

8 Claims, 18 Drawing Sheets

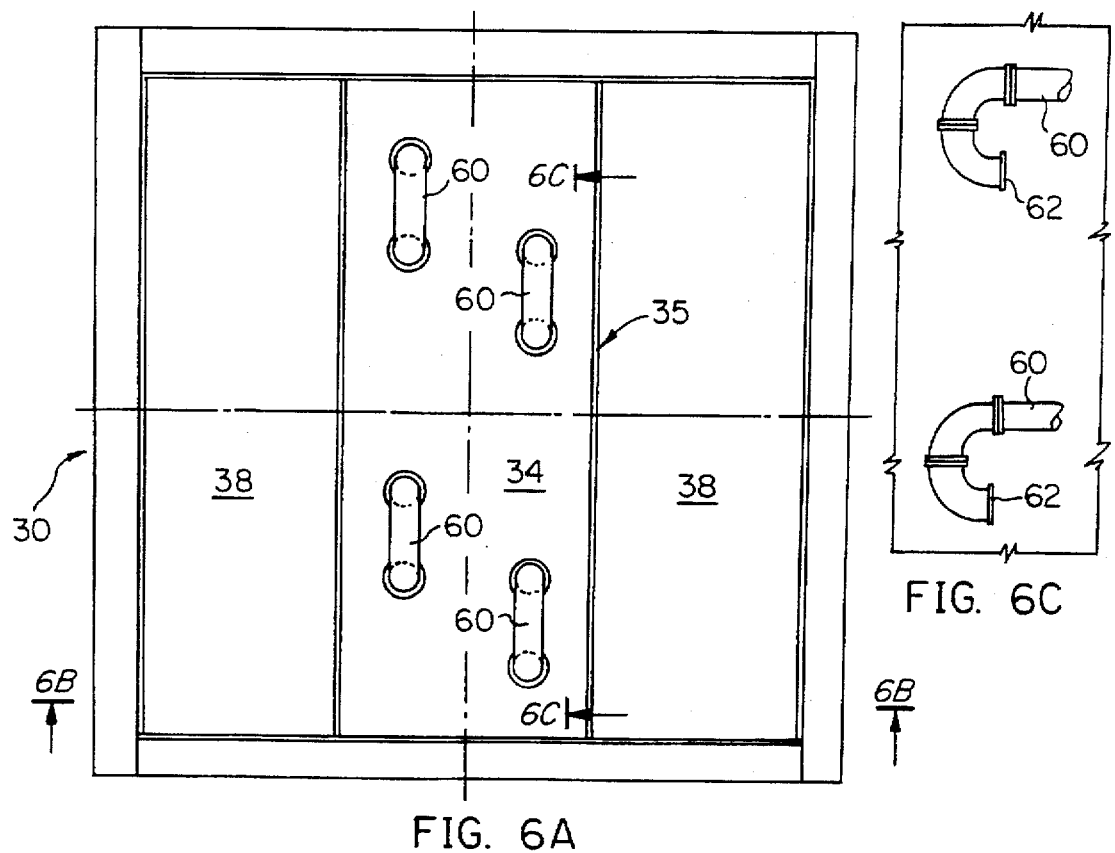
FIG. 6A
FIG. 6C
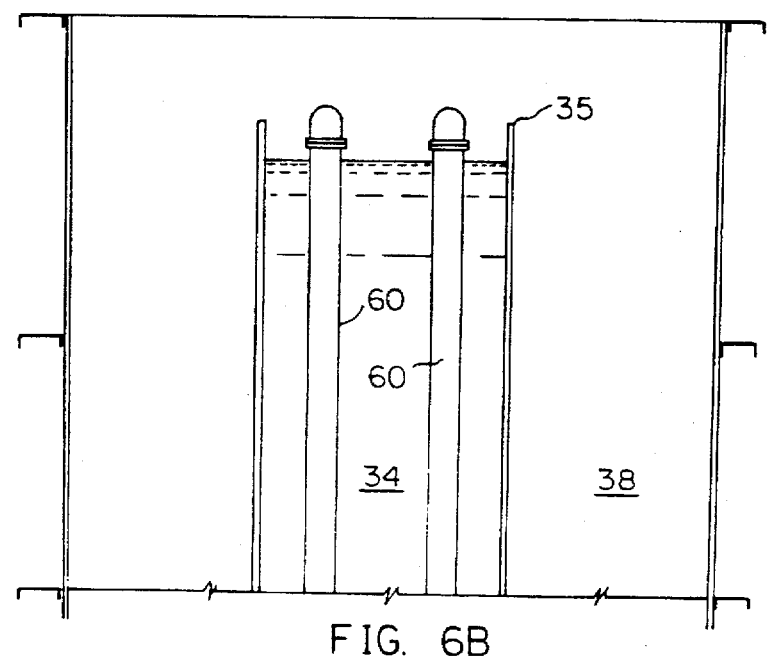
FIG. 6B

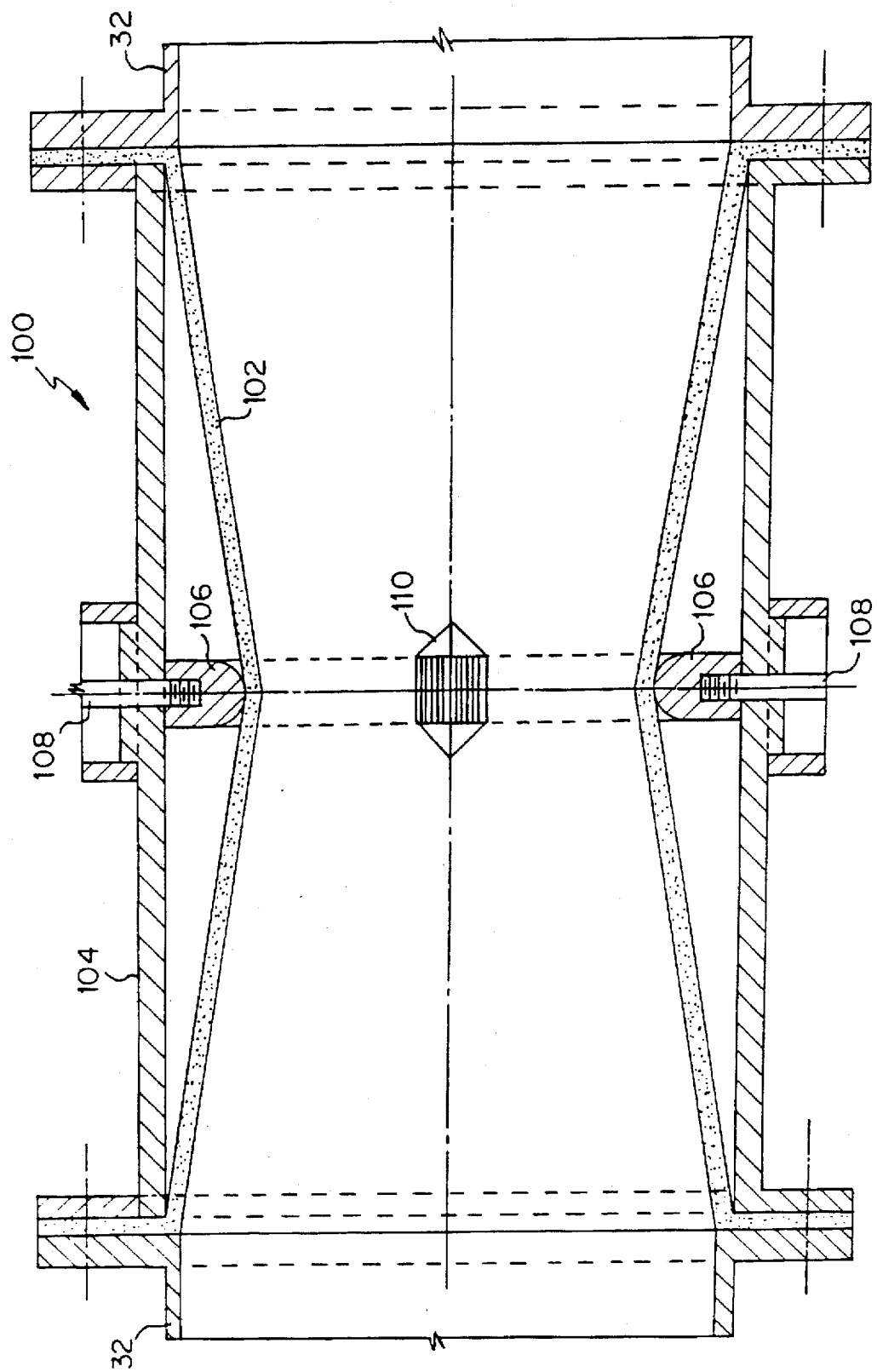

WASTE WATER TREATMENT PLANT

FIELD OF THE INVENTION

This invention relates to a waste water treatment plant and in particular to a modular, compact unit capable of treating sewage sludge to efficiently separate the solids therein so that the effluent is suitable for disposal or reuse.

DESCRIPTION OF THE PRIOR ART

Typically waste water treatment processes use three phases in each of two stages. In most configuration four tanks are used; two tanks for each stage. The phases then of aerating and settling typically occur in one tank, and the clarification phase occurs in a separate tank. It is, however, known to combine three phases in a single tank as was done for example in U.S. Pat. No. 4,192,740.

In the device described in that patent, waste water is supplied to a central, conical biological reaction zone within a vessel wherein the biological oxygen demand is met with air injected laterally to the flow. The waste water then exits the bottom of the conical reaction area whereupon solids settle out, and it is clarified as it rises to the top of the reaction vessel around a conical baffle. See also U.S. Pat. No. 5,395,527.

Typically the center aeration portion of the tank is suspended over a relatively flat bottom used for settling, and the settled sludge is transported to the center of the tank with a mechanical scraper. The area outside of the suspended, aeration portion is used as the clarification phase.

Such prior devises however suffer from at least two deficiencies. A very large portion of the clarifying phase is exposed to the settling phase below and this exposure permits gas laden solids in the settling phase to float to the surface of the clarification phase. These floating solids in turn migrate into the discard weir and into the launder and become part of the effluent.

This structure also permits a great deal of scum on the surface of the clarification area. When a round tank is employed it is extremely difficult to have effective scum removal. With a round tank the surface velocity changes from the center to the outside of the tank as the radius thereof changes.

In addition, typically, sewage treatment plants are not modular. A locality will have to evaluate its expected requirements over the life of a plant and then build an overcapacity plant accordingly to these projections. In other words, excess capacity must be built into the sewage treatment plant when it is constructed if it is to be used for many years.

A modular design, in contrast, would permit additions to the plant from time to time as the needs materialize rather than building projected capacity into a plant from the beginning.

The effectiveness of a modular plant however depends upon an effective flow control valve governing flow to the module. Due to the nature of raw domestic waste, the control valve must not have obstacles that would collect solids internally because an accumulation of foreign matter within the valve would change the flow characteristics thereof.

The valve would typically be controlled by air pressure related to the pressure in the flow going through the valve. Examples of such pinch type valves are shown in U.S. Pat. Nos. 4,781,356, 5,088,522, and 5,207,409.

In such prior pinch valves reducing the internal cross sectional area of a flexible conduit will cause undue wear at the pinched edges. The conduit portion of the conventional pinch valve then is subject to premature failure and therefore there is a need for a flow control valve design for such modular sewage treatment plants which is not subject to failure.

SUMMARY OF THE INVENTION

The modular plant of this invention combines aeration, settling and clarification in a single vessel and utilizes an internal aeration structure which has a flared bottom so that it is essentially funnel-shaped in cross-section. This structure in combination with a hopper bottom facilitates the settling of solids as the waste material passes downwardly through the aeration section. Water then rises around the edges of the aeration section upwardly in a clarification section whereas the hopper bottom facilitates the accumulation of solids for removal.

The hopper bottom then greatly increases the efficiency of collecting solids to be recirculated back to the point of the influent to be remixed with new raw waste for recycling. Furthermore, in the aeration section, air is introduced at the bottom of the aeration section counter-currently to the downward flow of waste materials so that the air is injected at a 180 degree angle to the incoming flow of waste water to be aerated. This eliminates short circuiting and improves the efficiency of the aeration phase over conventional processes wherein air is injected at a 90 degree angle to the flow.

Concerning the flow control valve, as noted above, a main weakness in a conventional pinch valve is the large probability of failure due to stress placed on the conduit edges when the valve is closed. A pinch bar must squeeze the walls of a conduit to close the same, and the stress induced at the edges by the closure will cause premature failure. It has been discovered however that the pinch valve can be improved by using tear drop inserts at the conduit edges and a corresponding angled pinch bar so that while the interior of the conduit is closed, the edges thereof are not stressed.

Accordingly, it is the object of this invention to provide a modular sewage plant wherein the phases of aeration, settling and clarification are combined in a single vessel.

It is another object of this invention to provide a modular sewage treatment plant wherein the three phases of each stage are carried out in a single vessel, and the number of vessel provided then is dictated by the capacity desired.

It is a further object of this invention to provide a sewage treatment vessel wherein an internal conical baffle is provided where the incoming sewage is aerated, and air is injected into the flow therethrough counter-currently at a 180 degree angle to the flow.

It is another object of this invention to provide a sewage treatment plant wherein the phases of aeration, settling and clarification are provided in a single vessel and wherein the lower portion of the vessel is the settling section and such section has a hopper-like base wherein the side walls are angled, to facilitate accumulation of solids for recycling.

It is a further object of this invention to provide a control valve for a sewage treatment vessel of a pinch valve type wherein tear drops are provided internal at the edge portions so that when the valve is closed, stress will not be applied to the edges of the conduit.

These and other objects will become really apparent with reference to the drawings and following description wherein:

BRIEF DESCRIPTION OF DRAWINGS

FIG. 5b is a cross sectional view with the center section removed taken along lines of 5b—5b of FIG. 5a;

FIG. 6a is a plan view of an embodiment of the vessel of this invention showing the recirculation piping;

FIG. 6b is a fragmentary sectional view taken along lines 6b—6b of FIG. 6a;

FIG. 6c is a fragmentary view taken along lines 6c—6c of FIG. 6a;

FIG. 7b is a cross sectional view taken along lines 7b—7b of FIG. 7a;

FIG. 8b is a cross sectional view taken along lines of 8b—8b of FIG. 8a;

FIG. 15b is a cross sectional view taken along lines 15b—15b of FIG. 15a;

FIG. 15c is a fragmentary cross sectional view of the scum remover of FIG. 15a;

FIG. 17 is a cross sectional fragmentary view showing the control pinch valve of this invention in the open position;

DETAILED DESCRIPTION OF THE PREFERRED EMBODIMENTS

Figure 1:
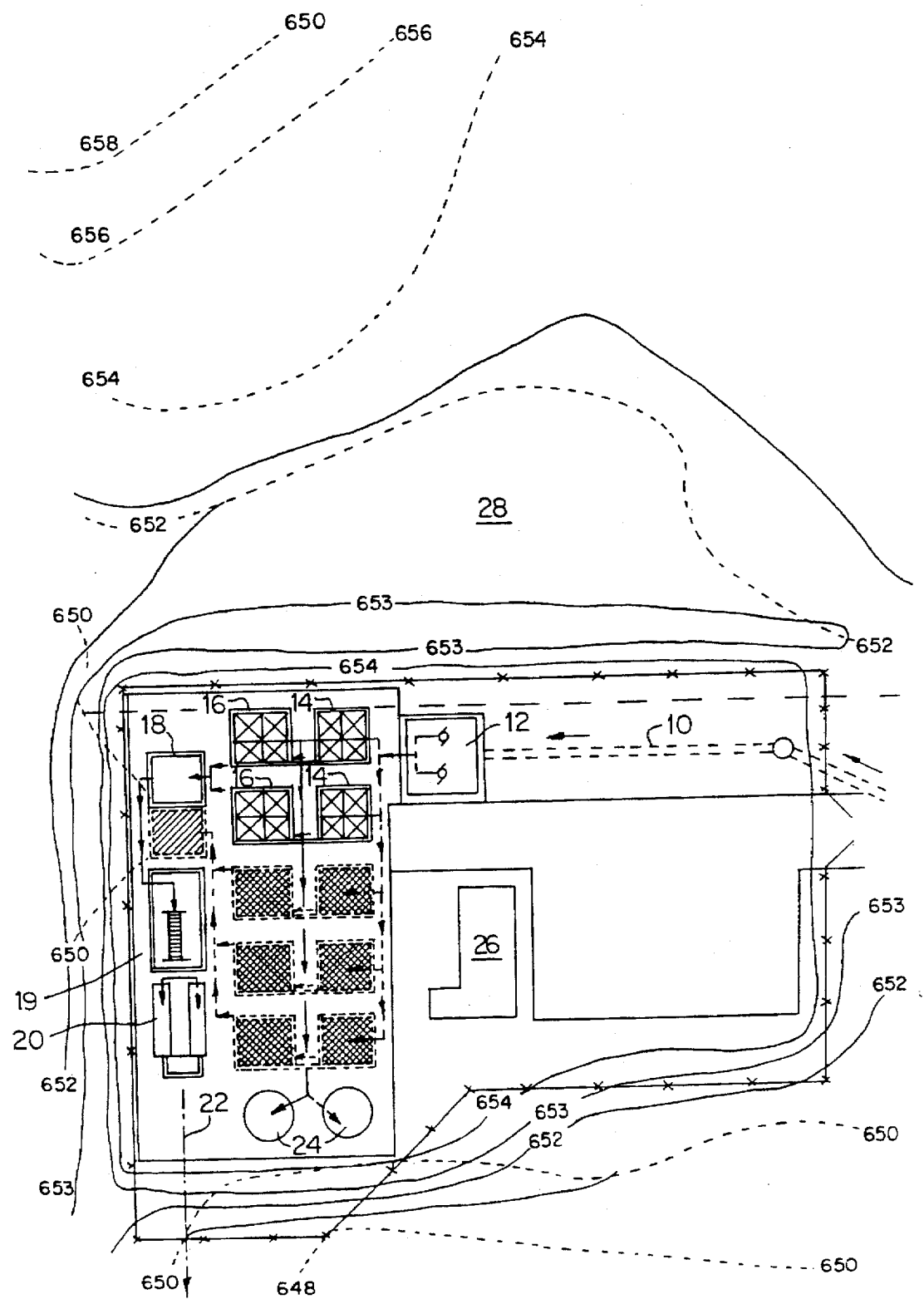
FIG. 1 is a plan view of a typical sewage treatment plant using the modular vessel of this invention.

With attention to the drawings and to FIG. 1 in particular there is shown a schematic representation of a typical sewage treatment plant utilizing the vessel of this invention.

In the plant, the inflow 10 passes through a equalizer 12 and is distributed to first stage vessels 14. Additional vessels are shown in cross hatching representing future expansion. From first stage vessel 14 the material passes to second stage vessels 16 which is identical in construction as will be explained.

The downstream treatment also includes a denitrifacation and re-aeration station 18 followed by a filter 19 and subsequently, treatment by ultra-violet 20. The effluent from conduit 22 then should be suitable for discharge. Solids from the first stage 14 and the second stage 16 are ultimately transported to digester 24. As shown, the plant would also include a control room 26 which would house the necessary electrical controls, and the surrounding area would constitute a buffer 28 in the conventional fashion.

The vessel of this invention combines the steps of aeration, settling, and clarification in a single tank and the same vessel may be used in either first or second stage treatment. It will be understood that the first stage vessel 14 and the second stage vessel 16 are identical.

In addition, in the embodiment to be hereinafter described, the vessel will be pictured as square in cross-section. The vessel however could be round or rectangular within the scope of this invention. The square in cross-section vessel then is included for illustrative purposes only and is not intended to be a limitation of this invention.

Figure 2:
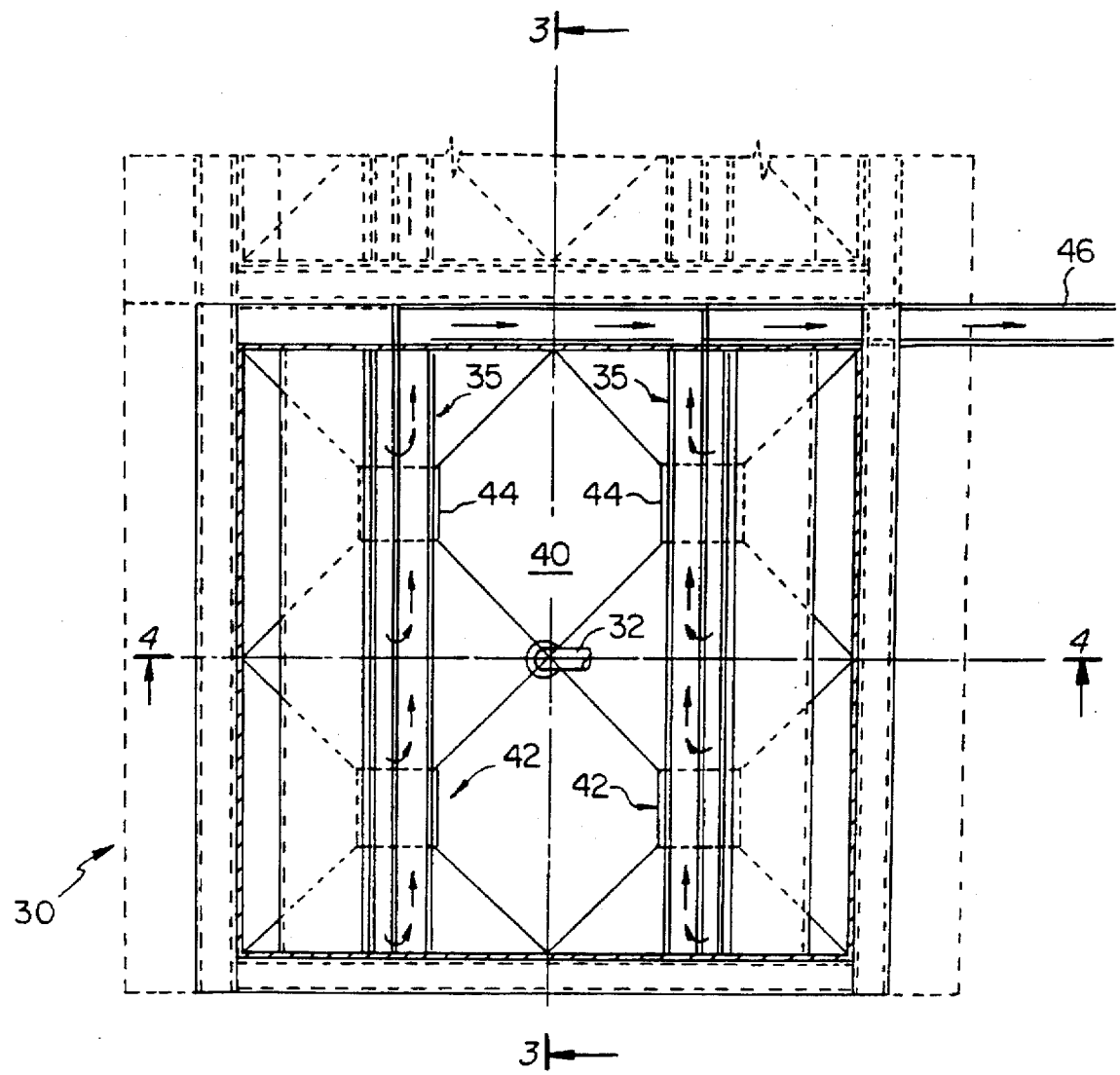
FIG. 2 is a top view in partial section of an embodiment of the vessel of this invention.
Figure 3:
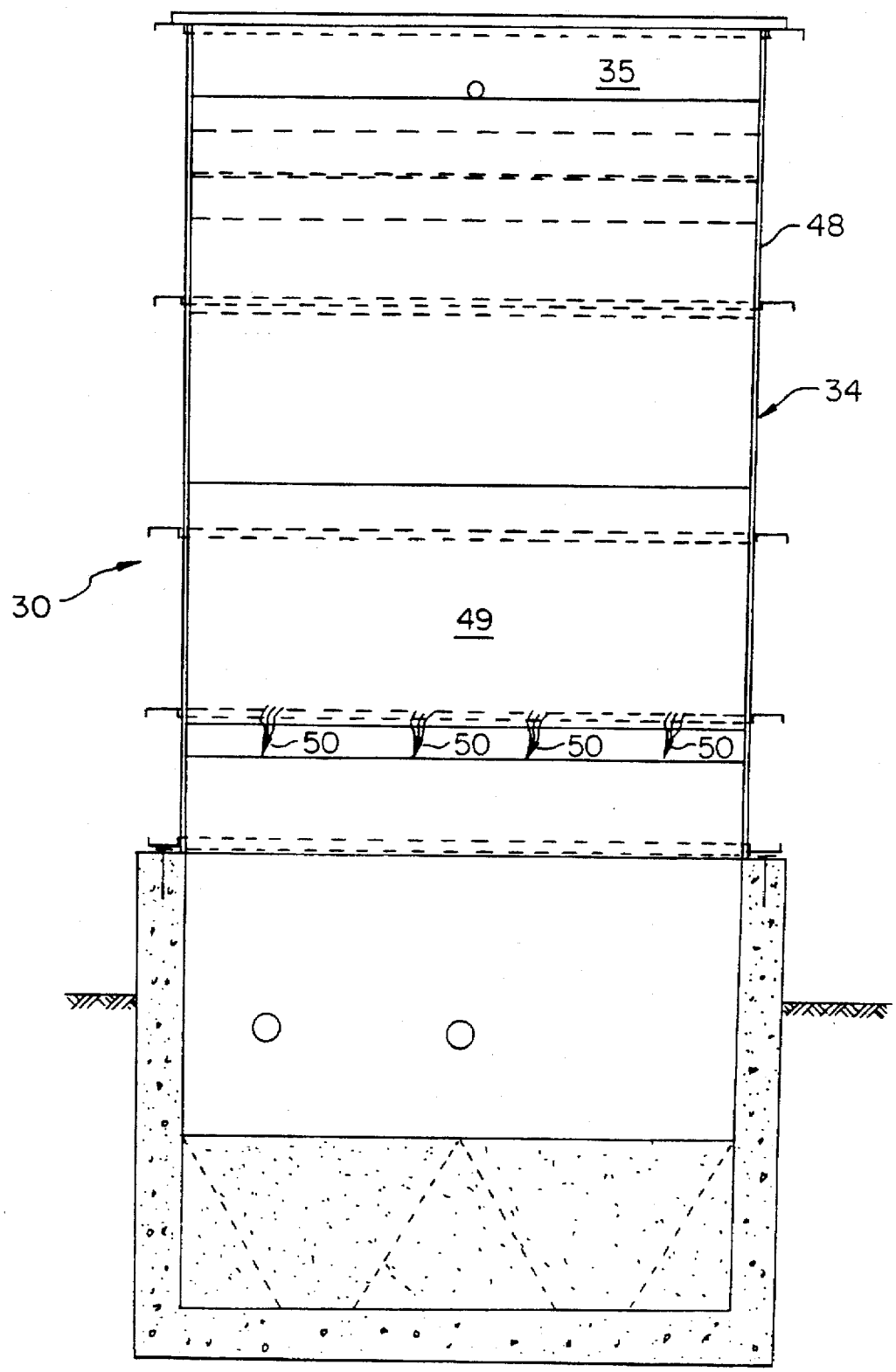
FIG. 3 is a longitudinal cross sectional view taken along lines 3—3 of FIG. 2.
Figure 4:
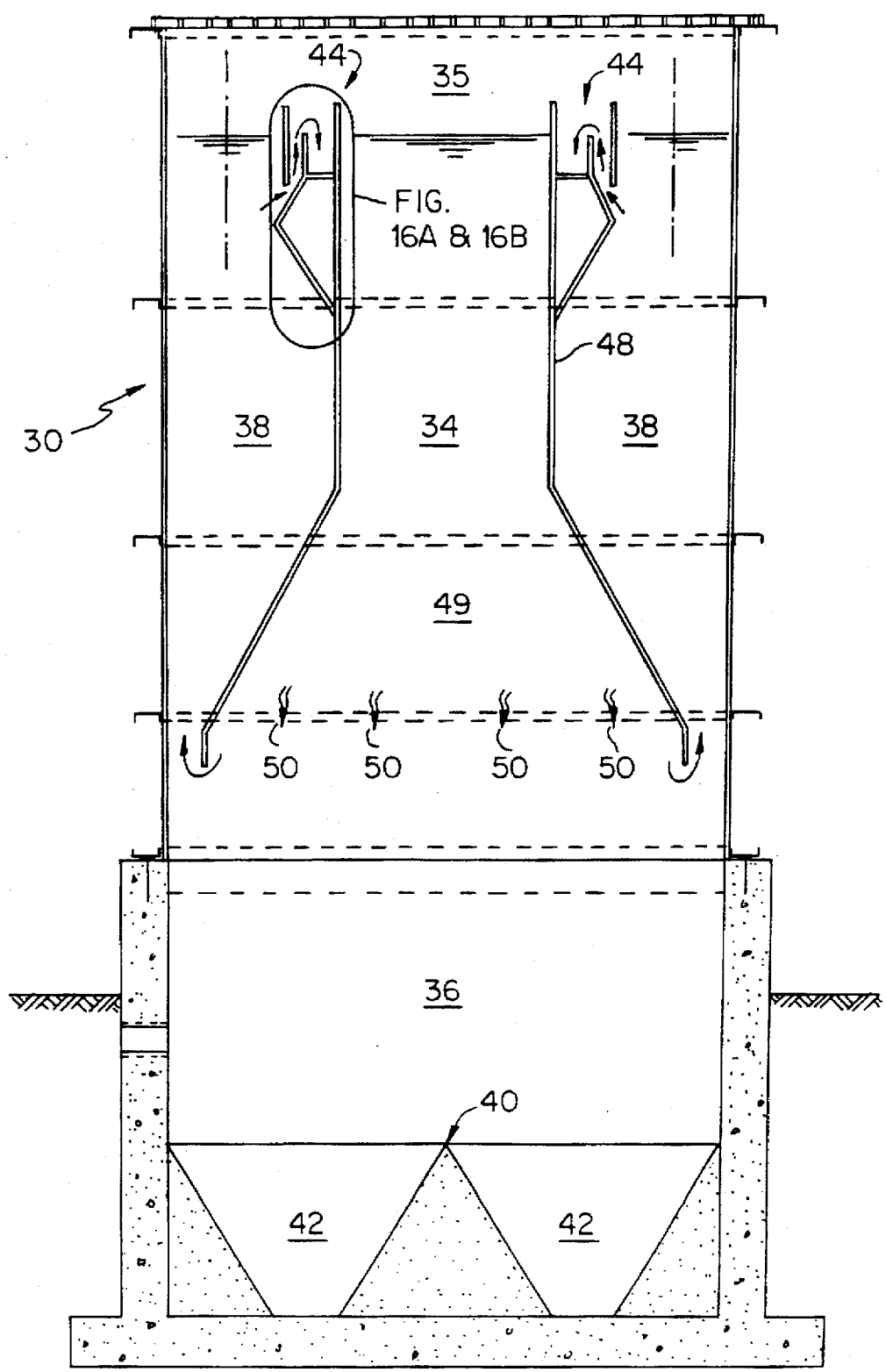
FIG. 4 is a cross sectional longitudinal view taken along lines 4—4 of FIG. 2.

With attention to FIG. 2, 3, and 4, the vessel of this invention 30 is intended to receive raw sewage fed through a pipe 32 located at the top thereof and centrally disposed over the vessel 30. Vessel 30 in general includes an internal aeration portion of 34, a settling portion 36 and a clarification portion 38 which surrounds the aeration portion 34. The bottom 40 of vessel 30 consists of hoppers 42 intended to facilitate the accumulation of solids.

Opposed weir members 44 are provided adjacent the upper portion of the aeration section 34 for the purpose of separating clarified water which exits the tank through outflow 46.

As shown in FIGS. 3 and 4, the aeration section 34 includes sidewalls 48 which extend downwardly through the vessel 30 and expand in a conical section of 49 wherein the air dispensing nozzles 50 are located. Nozzles 50 are intended to dispense air upwardly into the falling stream of sewage from inflow pipe 32 which is disposed above the mouth 35 of the aerator portion 34. The air streams from nozzles 50 then are directed counter-currently to the descending flow at about a 180 degree angle thereto. Solids in the stream then descend into the settling portion 36 while the liquid flows upwardly around the edges of the aeration conical section 49 and upwardly into the clarification portion of the vessel of this invention.

Figure 5A:
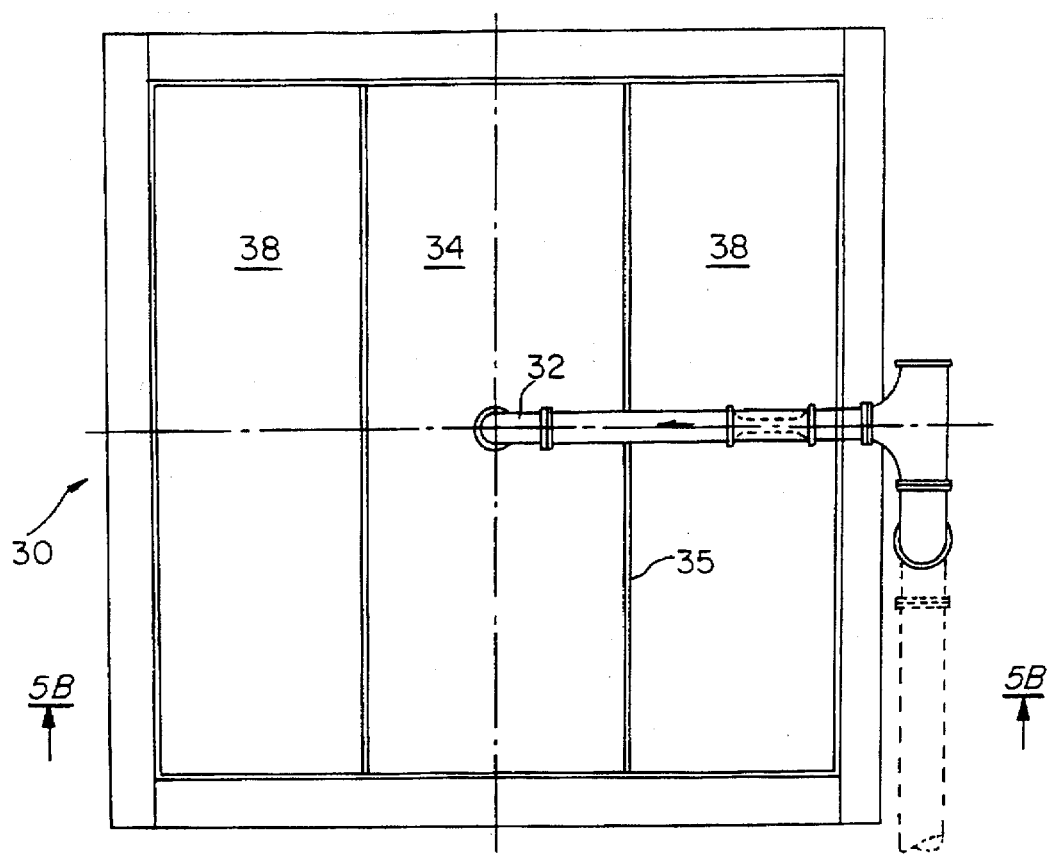
FIG. 5a is a plan view of an embodiment of the vessel of this invention.
Figure 5B:
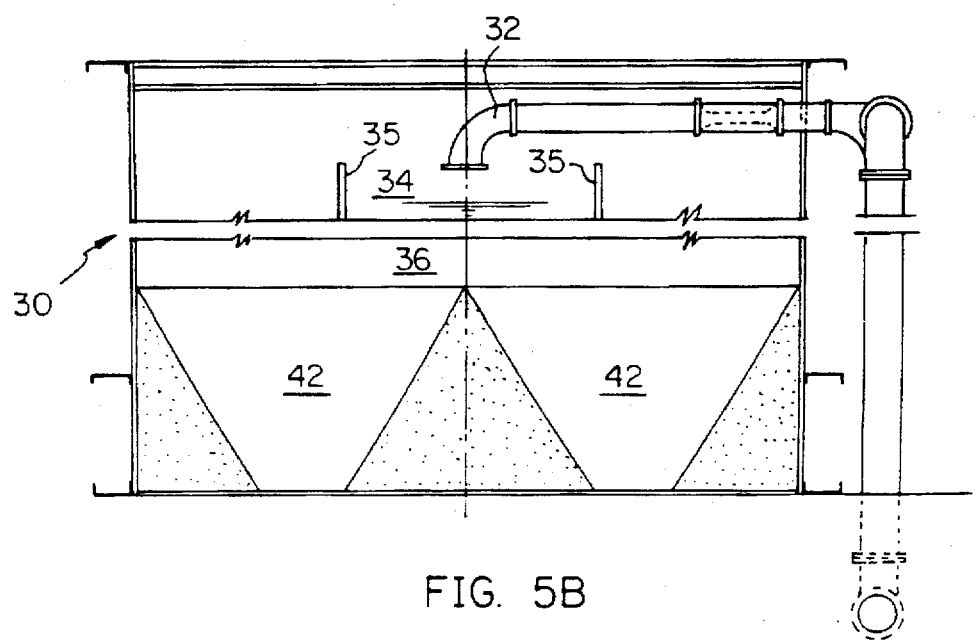

With attention to FIGS. 5a and 5b, the inflow of raw sewage through pipe 32 is directed downwardly into the center of the upwardly open top 35 of the aeration section 34. FIG. 5b is a vertical section of the vessel of this invention 30 with the center portion removed to illustrate this feature. As shown, the pipe 32 is centered on both the aeration section 34 and the settling section 36 therebelow.

The hoppers 42 and the base 40 may be formed of plastic inserts having slopped sides as shown to facilitate solid removal as will be subsequently explained.

With attention to FIGS. 6a and b, 7a and b, 8a and b and 9–11, the sludge which accumulates in hoppers 42 in the settling portion 36 is intended to be partially recirculated through the vessel 30 and a portion drawn off for transport to the digester 24. Concerning recirculation, pipes 60 are provided which extend upwardly from the hoppers 42 and empty into the upper opening 35 of the aeration portion 34 through outlets 62 as shown in FIG. 6c. As will be subsequently explained compressed air is used to convey the sewage solids upwardly through pipes 60.

Figure 7A:
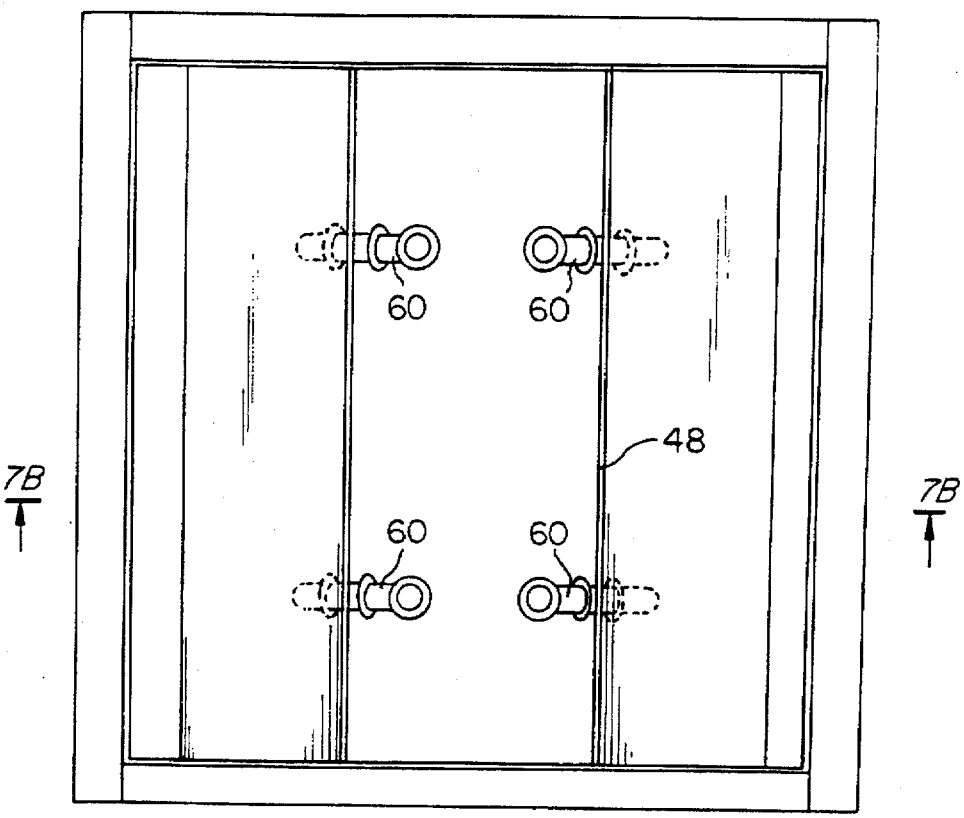
FIG. 7a is a plan view taken at a lower level in the embodiment of the vessel of this invention.
Figure 7B:
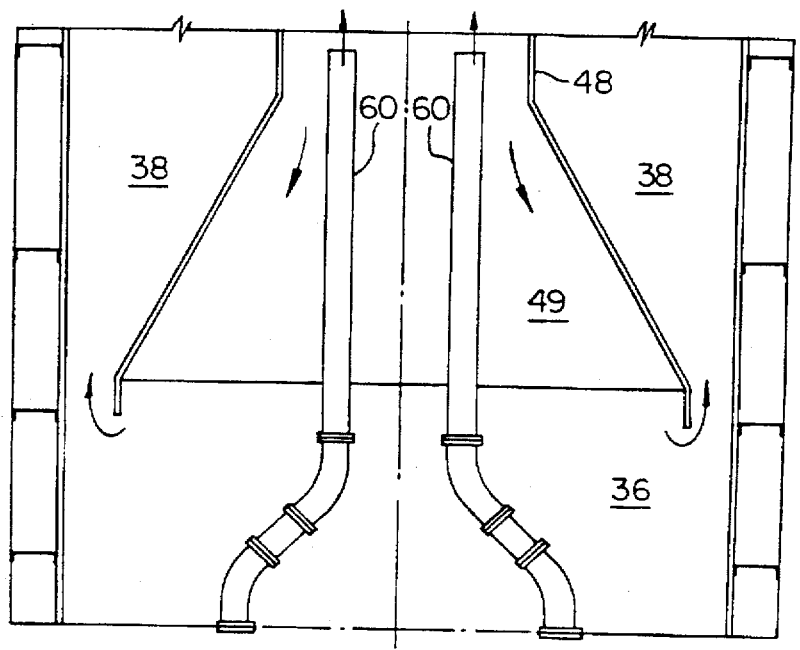

With attention to FIGS. 7a and 7b, pipes 60 extend downwardly through the expanded portion 49 of the funnel shaped aerator and into the settling portion 36.

Figure 8A:
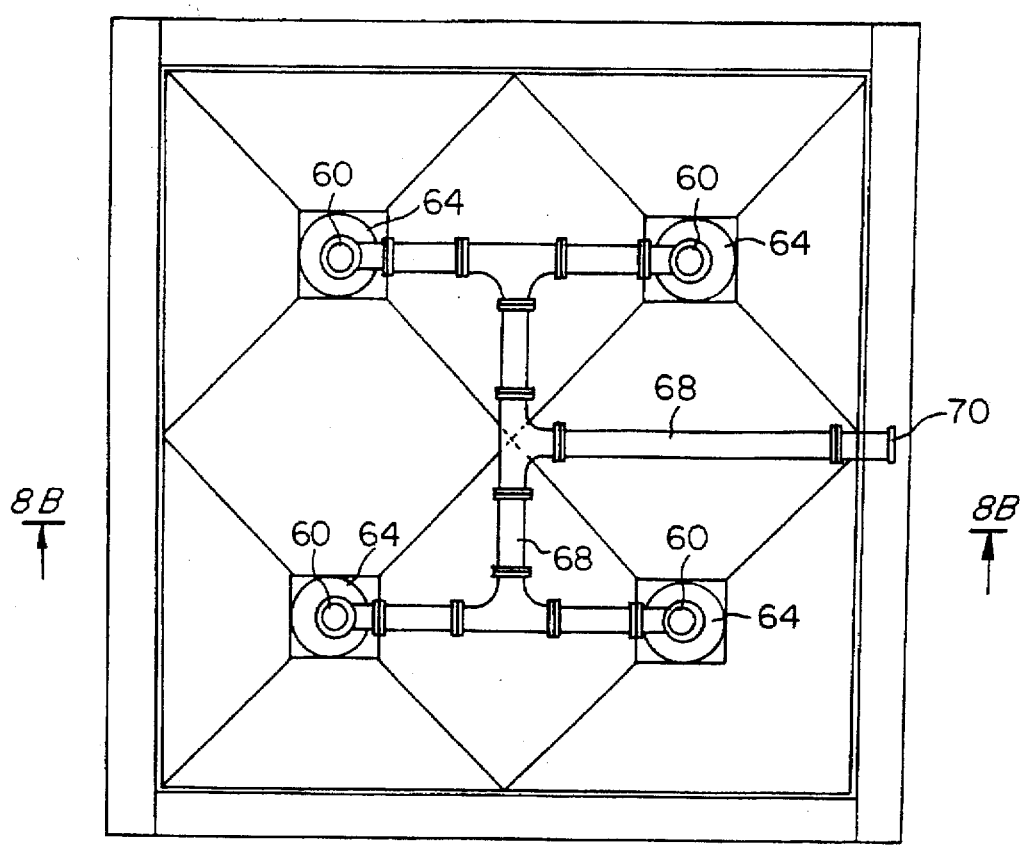
FIG. 8a is a plan view of the an embodiment of the vessel of this invention with the upper chambers removed showing the settling chamber.
Figure 8B:
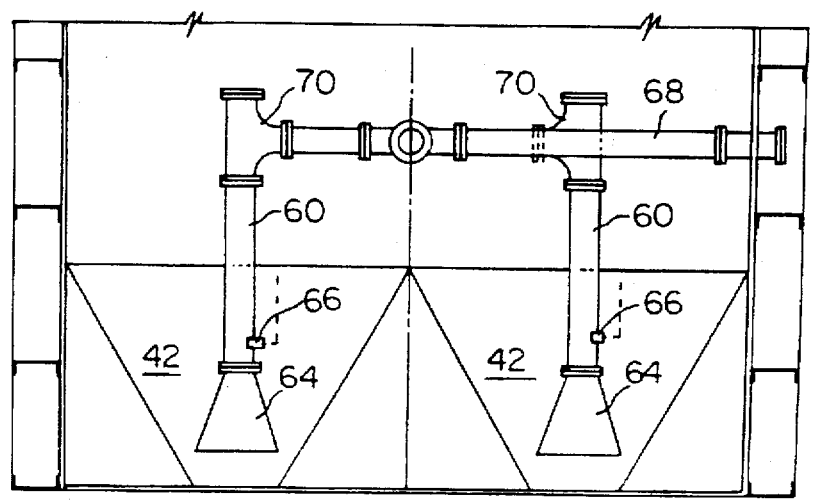
Figure 9:
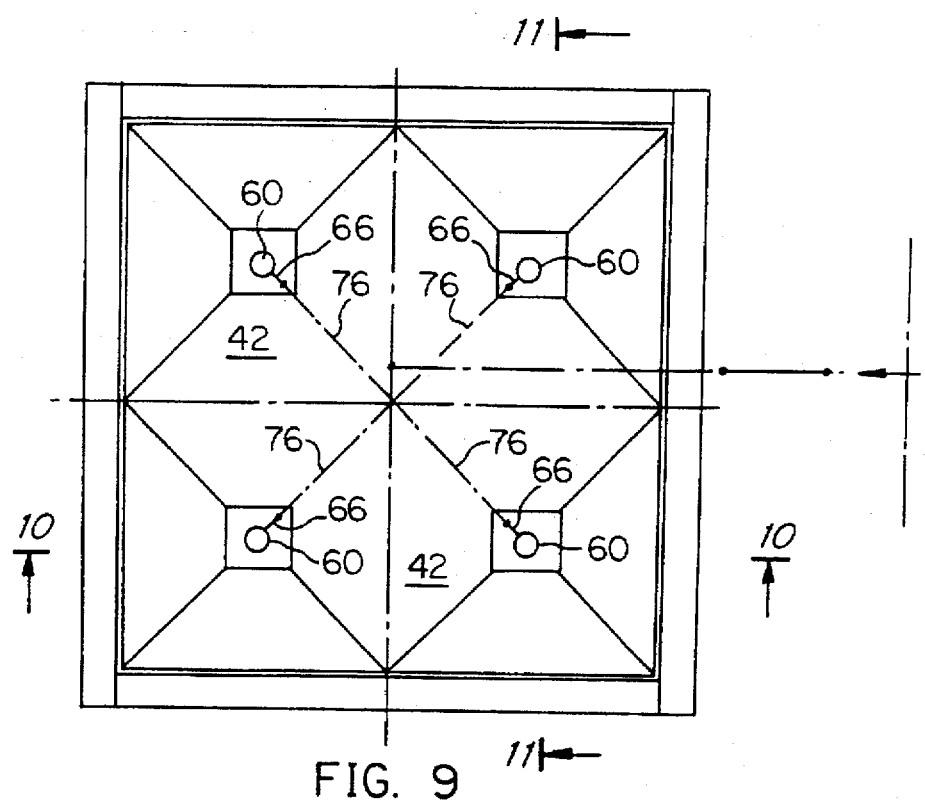
FIG. 9 is a plan view of an embodiment of the vessel of this invention with the settling chamber removed.
Figure 10:
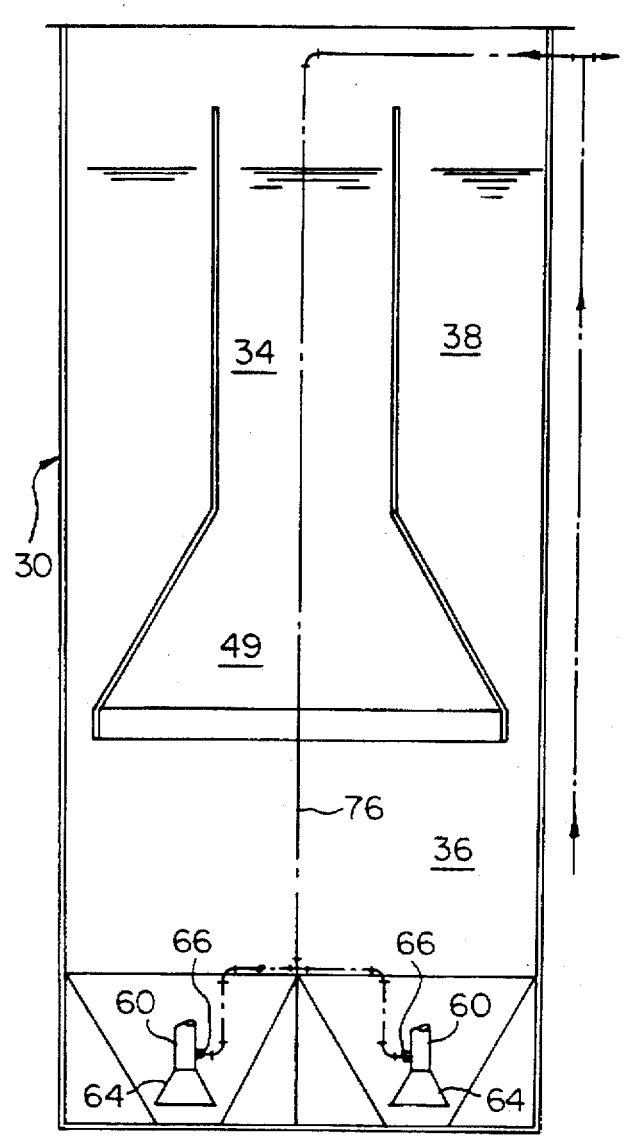
FIG. 10 is a cross sectional view taken along lines 10—10 of FIG. 9.
Figure 11:
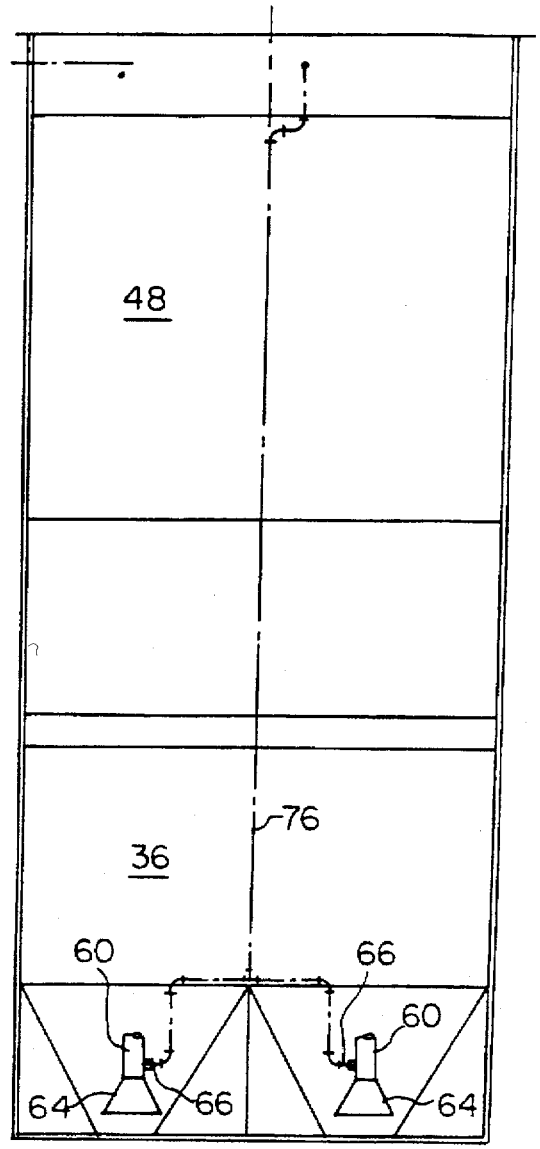
FIG. 11 is a cross sectional view taken along lines 11—11 of FIG. 9.

With attention to FIGS. 8a and 8b, pipes 60 terminate in anti-vortex members 64, each of which is disposed in a hopper 42. Air lines 66 are provided adjacent the members 64. Pipes 60 are also connected to a sludge draw off system of pipes 68 at a junction 70 wherein sludge solids may be removed via piping system 68 to outlet 70 and to the digester 24, ultimately. With attention to FIGS. 9–11, the air inlet 66 is supplied by an air line 76 through the aeration portion 34 and the settling portion 36 along the center line of the vessel 30.

Figure 12:
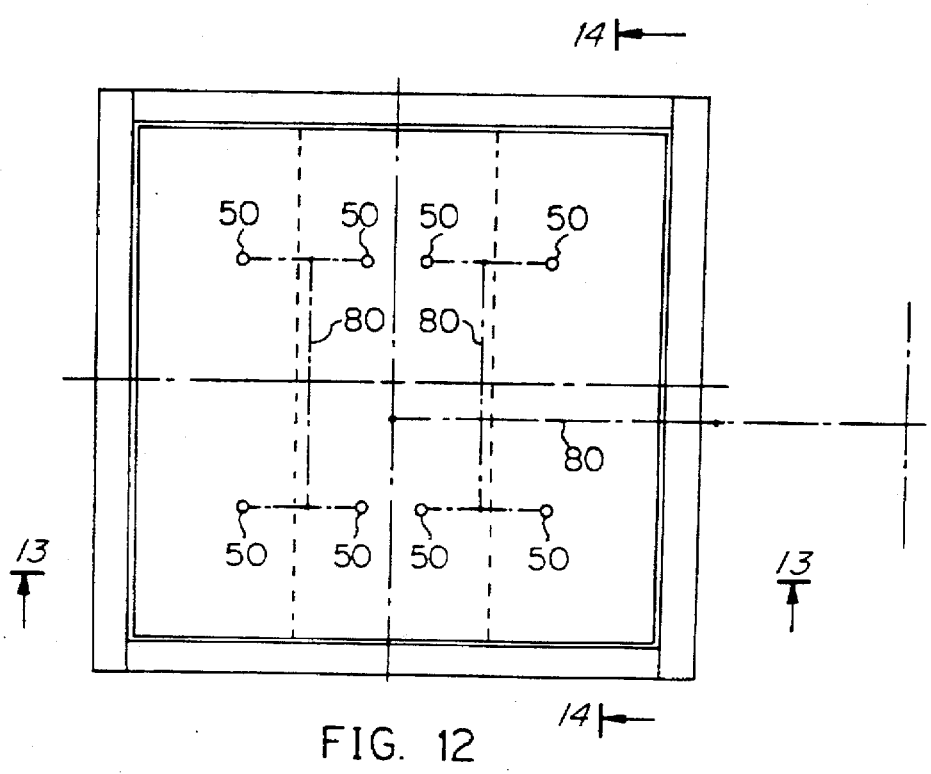
FIG. 12 is a plan view showing the air supplied to the aeration chamber.
Figure 13:
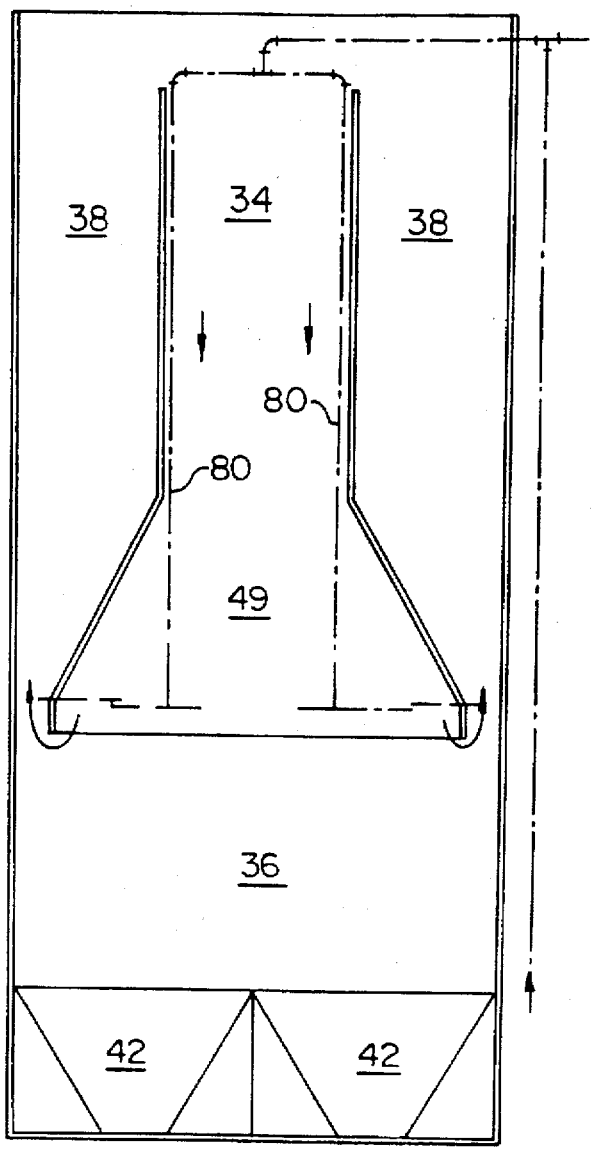
FIG. 13 is a cross sectional view taken along lines 13—13 of FIG. 12.
Figure 14:
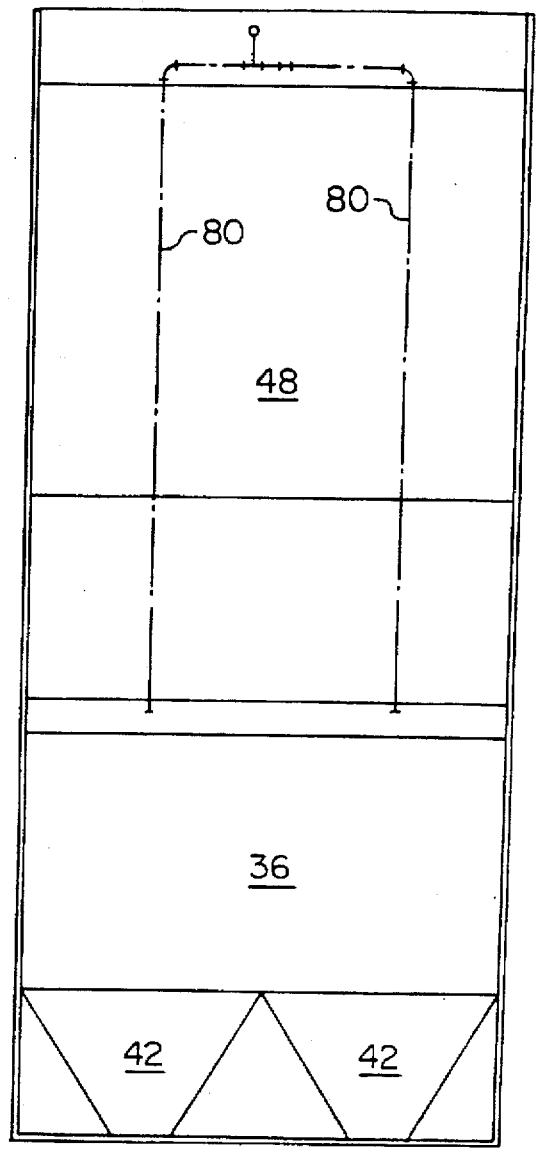
FIG. 14 is a cross sectional view taken along lines 14—14 of FIG. 12.

With attention to FIGS. 12, 13, and 14, the air system for nozzles 50 similarly includes an air line 80 which extends downwardly through the aeration section 34 and into the expanded conical section 49 before it is coupled to nozzles 50. Nozzles 50, as shown in for example FIG. 4 are mutually spaced around the downwardly opening edge of the aerator expanded conical portion 49. As previously described the nozzles 50 extend vertically upwardly so that air is injected into the downwardly flowing sewage at a 180 degree angle thereto or counter-currently. It has been found that this dramatically increases the efficiency of the aeration phase.

With attention to FIGS. 15a–c and 16a and b there is shown therein the scum remover in weir 44.

Figure 15A:
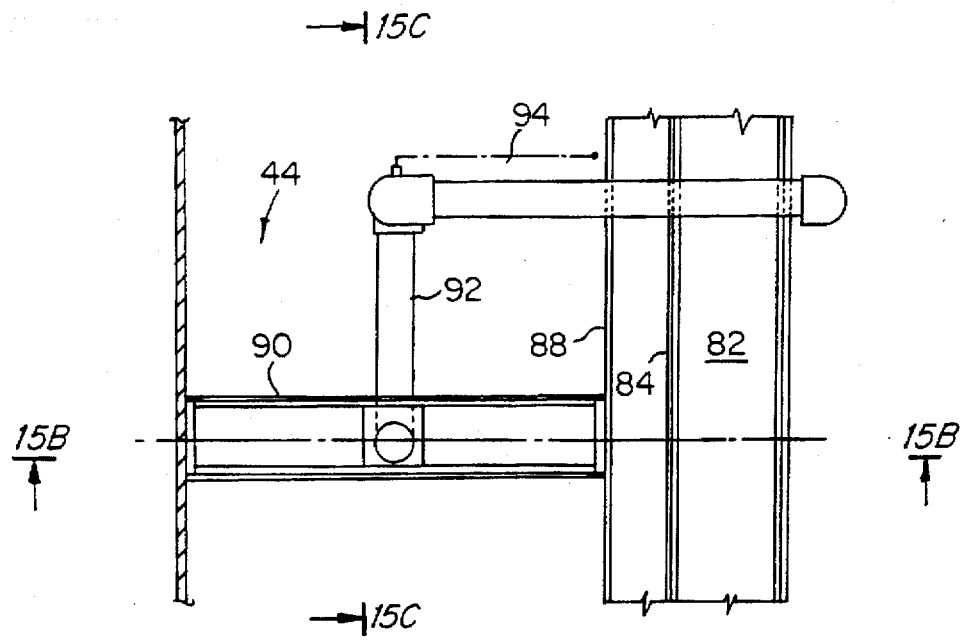
FIG. 15a is a fragmentary plan view showing the scum removing weir located above the aeration chamber as part of the clarifier chamber.
Figure 15B:
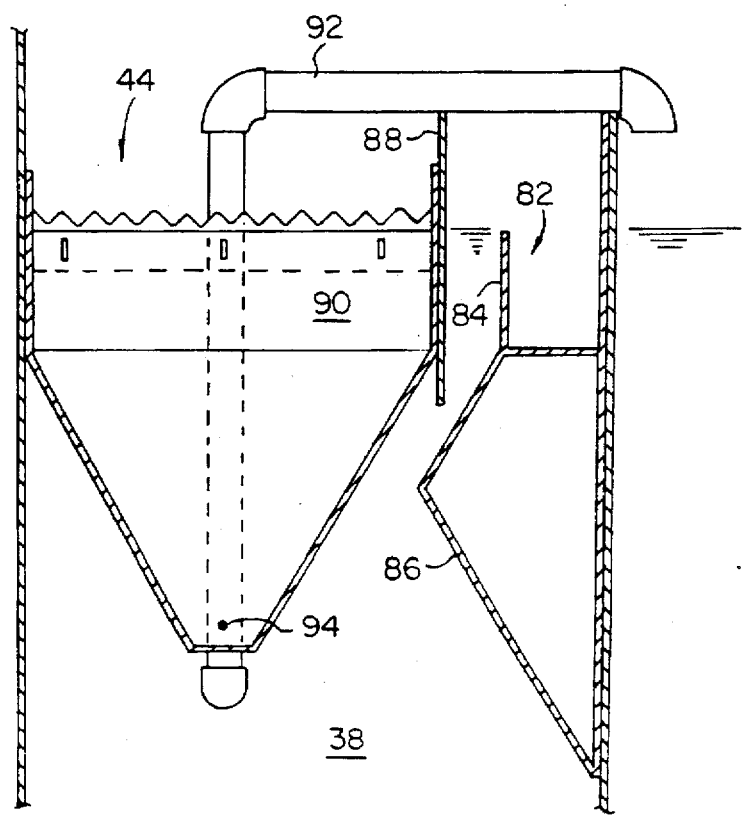
Figure 15C:
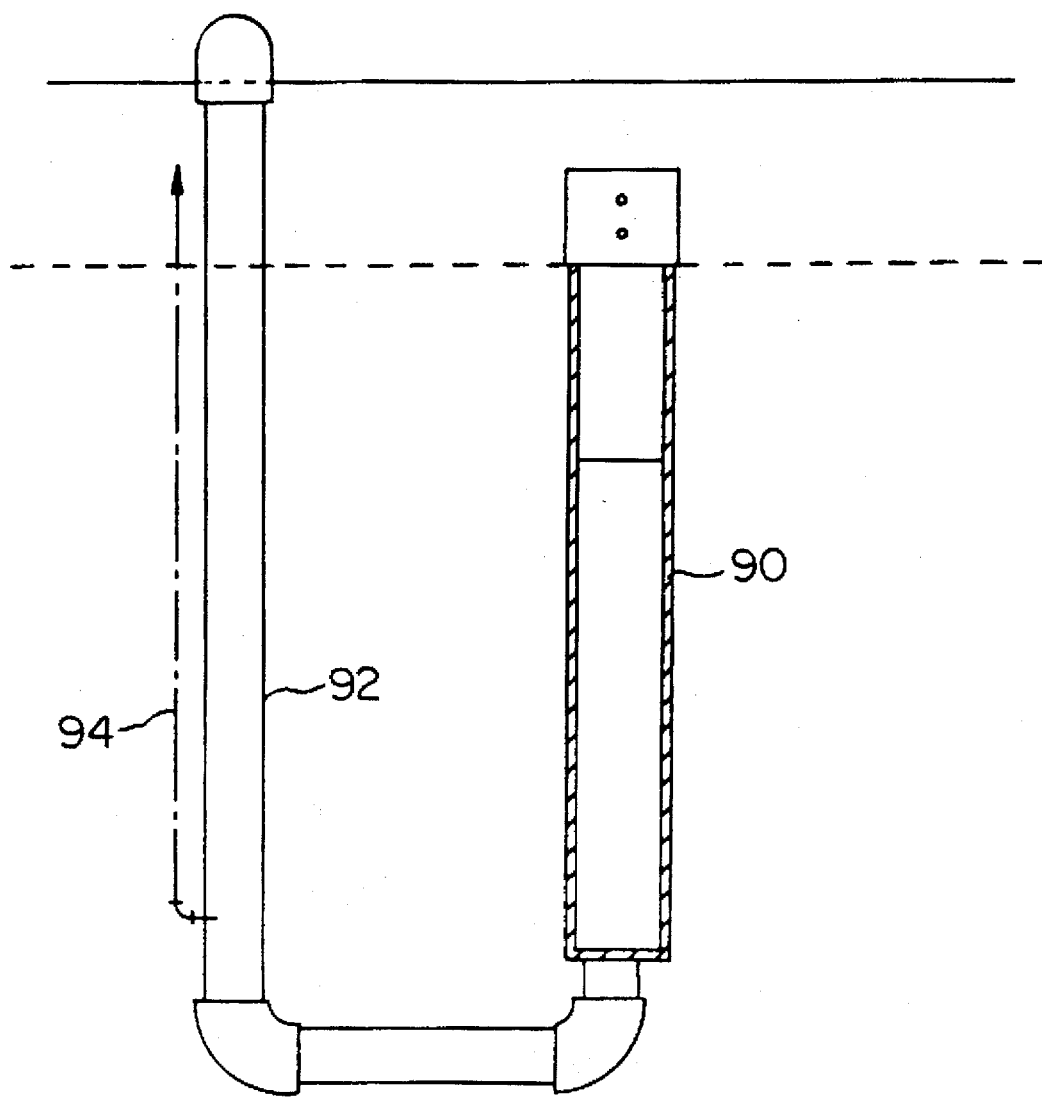

With attention to FIGS. 15a and b, there is provided a launder 82, which in combination with a weir 84 and deflection baffle 86, conveys liquid from the clarification section 38 for removal through conduit 46 as shown in FIG. 2. In connection with the launder 82 there is also provided a scum remover consisting of a scum baffle 88, a V-notch weir 90 and a removal conduit 92, scum then from the surface encountering the baffle 88 enters the weir 90 whereupon it is removed by suction through conduit 92 in a conventional fashion. An aerator 94 is provided to facilitate this removal.

Figure 16A:
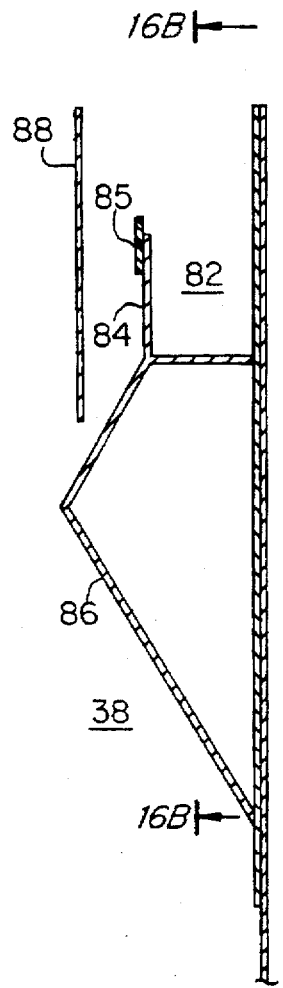
FIG. 16a is a fragmentary cross sectional view of the deflection baffle in the aeration chamber of this invention.
Figure 16B:
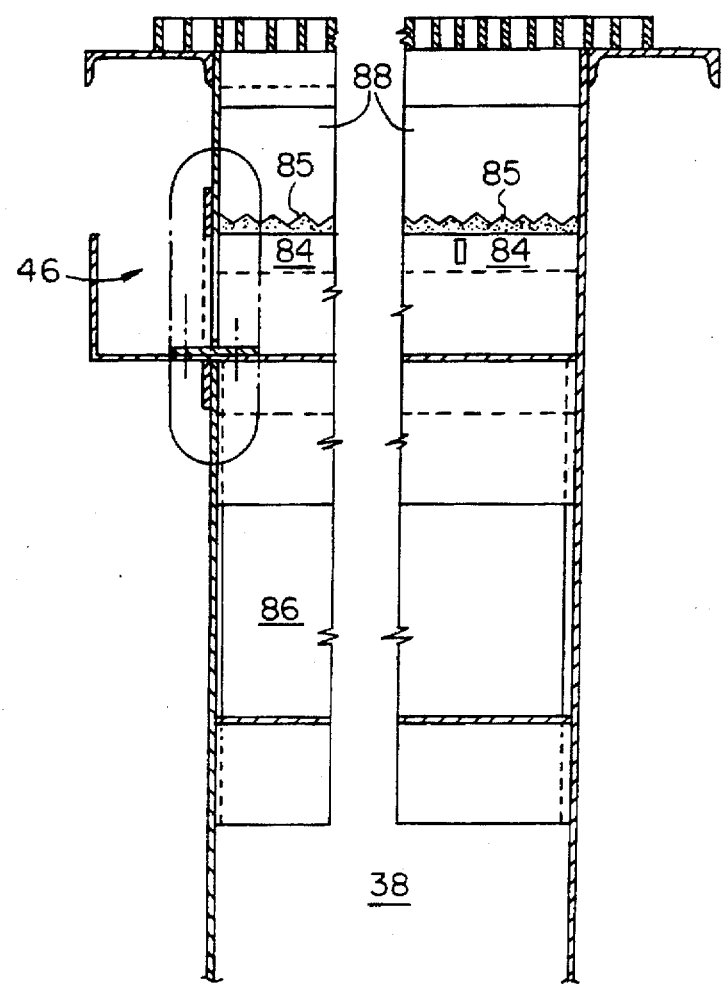
FIG. 16b is a cross sectional view taken along 16b—16b of FIG. 16.
Figure 18:
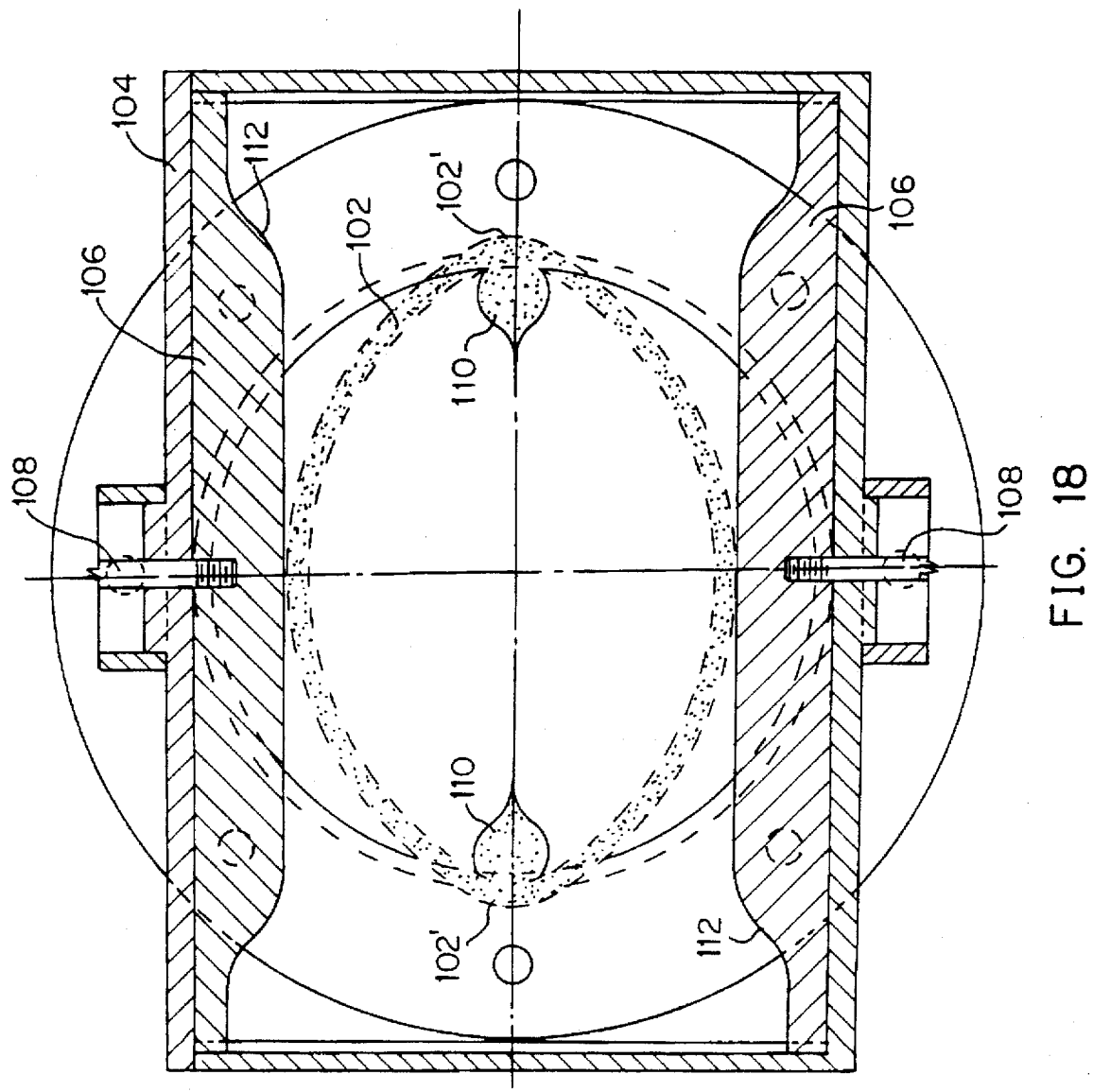
FIG. 18 is a cross sectional view taken laterally through the valve of this invention.
Figure 19:
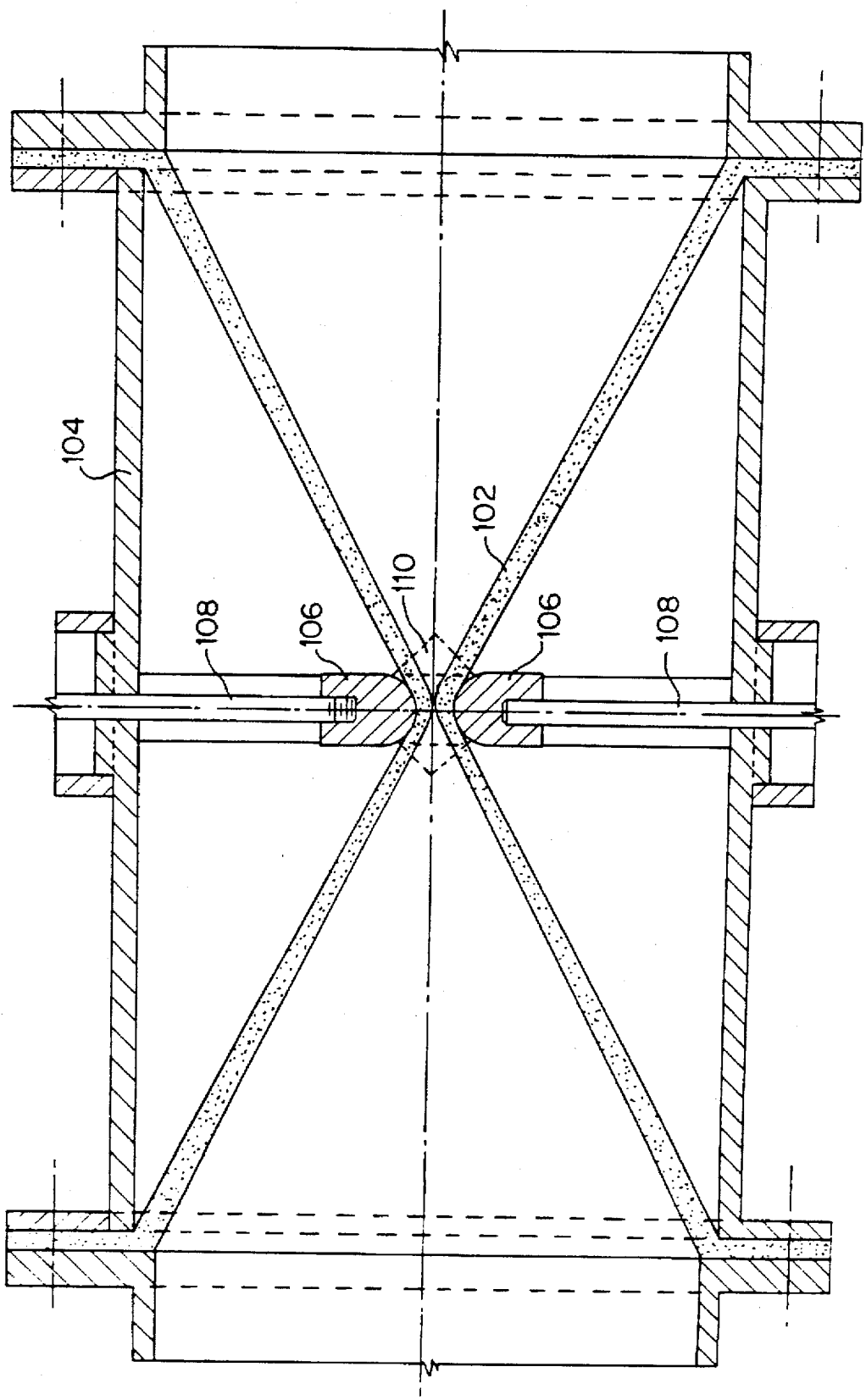
FIG. 19 is a cross sectional view similar to FIG. 17 showing the valve of this invention in a closed position.
Figure 20:
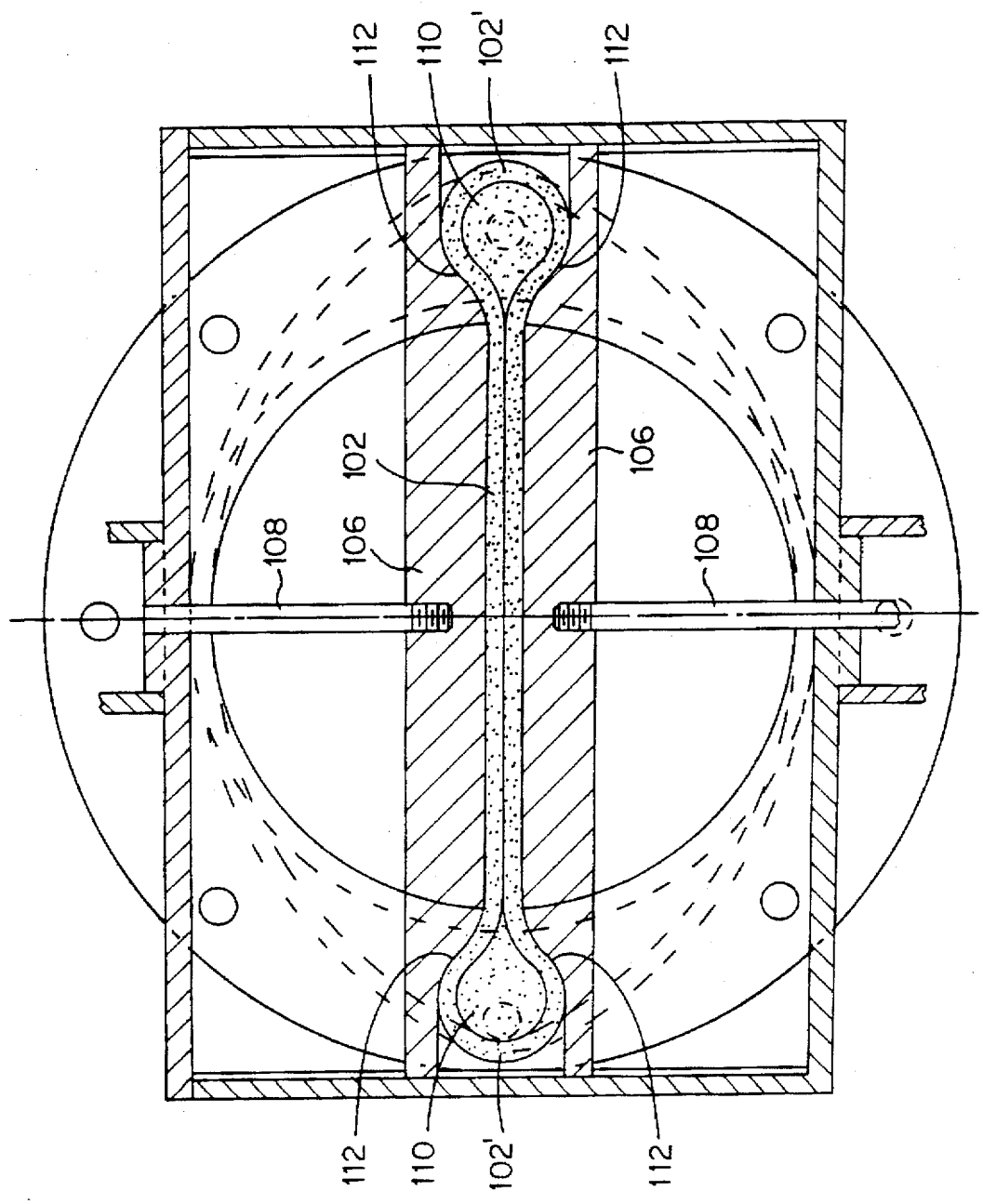
FIG. 20 is a cross sectional view similar to FIG. 18 showing the valve of this invention in a closed position.

As shown in FIGS. 16a and 16b preferable the weir 84 has an upper surface of fiberglass forming a V-notch 85 which extends along upper surface of the weir. Obviously, scum which is removed by the weir 90 could be removed from the system through conduit 92 or recycled to the aeration section 34 for recirculation through the vessel 30 of this invention.

With attention to FIGS. 17–20 each vessel 30 must have a flow control valve 100 which controls the flow of sewage through the conduit 32 into the vessel 30. The flow control valve of this invention includes a flexible casing 102 which is disposed in line with conduit 32 and is jacketed with a preferably metal external jacket 104. Upper and lower pinch bars 106 are provided within the jacket 104 and are controlled by rods 108 to raise and lower the bars.

In order to eliminate stress to at the edges 102' of casing 102 flexible tear drop shaped members 110 are disposed at either side of the flexible casing 102 where the rounded portion 112 of push bars 106 will encounter the same. See FIG. 20.

The control valve then of this invention can be pinched shut or partially closed by vertical disposition of the pinch bars in the conventional fashion. However, stress on the flexible casing 102 will be eliminated by the tear drop inserts 110 and the rounded portions 112 of the pinch bars which the tear drops 110 are conformed to abut. This design then of this invention should eliminate the edge fatigue normally associated with failure of such pinch valves.

In summary, a modular sewage treatment system is described wherein the phases of aeration, settling, and clarification are combined in a single vessel wherein the aeration phase is dramatically improved in efficiency by injecting the air at the base of the aerator and directing it counter-currently to the descending flow of sewage to be treated. Solids are removed or recycled by a combination of a hopper base for the vessel and suction or anti-vortex members which remove the solids from the hopper whereupon a solids slurry may be recycled through the aeration section, or drawn off for further treatment.

The vessel of this invention is intended to be used as either the first or second stage or both of a conventional process for water treatment and the number of such vessels provided would be based upon the flow requirements therethrough.

The structure of the vessel of this invention however has dramatically improved and shortened the processing time necessary through each stage by the unique design.

As will be obvious skilled in the art the vessel of this invention is particularly suited for use in a two stage activated sludge waste water treatment plant with each stage being housed in one of the vessels of this invention.

Typically then, two of the vessels of this invention would be used in a basic waste water treatment plant. One would be used for the nitrification stage and the second for the denitrification stage. Whereas conventional sewage treatment plant methods for a given flow rate would require 24 hours minimum treatment time to 30 hours maximum, the equivalent flow can be treated according to a two stage process using the vessels of this invention in 9.8 hours.

Furthermore, the interior configuration wherein the configuration is rectangular or square will effect a cost savings of about 40% over the present state of the art whereas the round configuration should effect a savings of about 60% over the present state of the art. Both square or rectangular and round configurations are contemplated within the scope of this invention.

In addition, problems associated with failure of the flow control valve for admission of the sewage to be treated to the vessel has been solved by providing a pinch valve having internal tear drop inserts on either side thereof and providing pinch bars having rounded ends to abut the tear drops when the valve is closed whereby the fatigue normally associated with opening and closing a conventional pinch valve, at opposed diametrical edges is eliminated.

Although the present invention has been illustrated and described with reference to the preferred embodiment thereof, it should be understood that it is in no way limited to the details of such embodiment but is capable of numerous modifications within the scope of the appended claims.

What is claimed is:

1. A hollow vessel for containing three phases of a waste water treatment process having an upper portion, an open top, a lower portion and a base, said vessel comprising:
   an inverted, funnel shaped aeration chamber disposed in the upper portion of said vessel with a narrow open end extending upwardly to a level above a liquid level in the aeration chamber having a wastewater inflow pipe for directing wastewater downwardly into said aeration chamber and a flared open end disposed over the lower portion of said vessel, the walls of said chamber being spaced away from the sides of said vessel to form therebetween a clarification area with the walls forming the flared open end being closely spaced away from the sides of said vessel;

at least one upwardly opening hopper formed in and extending upwardly from the base, below the flared open end of said chamber;

air injection means mounted on the chamber walls forming the flared open end of said chamber and extending thereinto for injecting air upwardly, substantially parallel to the vertical axis of said chamber so that waste water directed downwardly through the narrow open end thereof will mix with a counter current flow of air as it passes downwardly therethrough;

solids removal means disposed within said hopper for removing solids accumulating therein, settling from aerated waste water in said chamber; and clarified water removal means disposed in the open top of said vessel for removing clarified water from said vessel around the narrow open end of said chamber.

2. The vessel of claim 1 wherein said water removal means includes means for separating surface scum from said clarified water as it is removed from said vessel.

3. The vessel of claim 2 wherein said scum separating means includes at least one weir.

4. The separating means of claim 3 wherein said weir defines a saw-tooth configuration along an upper portion thereof.

5. The vessel of claim 1 wherein the hopper in said base comprises an upwardly opening structure having four, inwardly sloping side walls and a flat bottom, said bottom being integral with the base of said vessel.

6. The vessel of claim 5 wherein a plurality of said hoppers are provided.

7. The vessel of claim 5 wherein said solids removal means includes a suction nozzle disposed over said flat bottom within said hopper and suction means coupled thereto for removing accumulated solids from the bottom of said hopper.

8. The vessel of claim 1 further comprising recycle means coupled to solids removal means for diverting a portion of the solid removal from said hopper and readmitting said diverted solids to said chamber through the narrow open end thereof.

\* \* \* \* \*